United States Patent
Takahashi et al.

(10) Patent No.: US 6,388,252 B1
(45) Date of Patent: May 14, 2002

(54) SELF-DETECTING TYPE OF SPM PROBE AND SPM DEVICE

(75) Inventors: Hiroshi Takahashi; Yoshiharu Shirakawabe; Nobuhiro Shimizu; Michel Despont, all of Chiba (JP)

(73) Assignees: Seiko Instruments Inc. (JP); International Business Machines Corporation

( * ) Notice: Subject to any disclaimer, the term of this patent is extended or adjusted under 35 U.S.C. 154(b) by 0 days.

(21) Appl. No.: 09/197,584

(22) Filed: Nov. 19, 1998

(30) Foreign Application Priority Data

Nov. 20, 1997 (JP) .............................. 9-320184
Jun. 19, 1998 (JP) ........................... 10-161175

(51) Int. Cl.⁷ .......................... G01N 23/00; G21K 7/00
(52) U.S. Cl. .......................... 250/306; 250/307; 73/105
(58) Field of Search ............................... 250/306, 307, 250/306.07; 257/414, 417; 338/2; 216/19; 73/105

(56) References Cited

U.S. PATENT DOCUMENTS

| | | | |
|---|---|---|---|
| 4,506,283 A | 3/1985 | Soclof | 357/51 |
| 5,172,205 A | 12/1992 | French et al. | 257/414 |
| 5,386,720 A | 2/1995 | Toda et al. | 73/105 |
| 5,985,708 A | * 11/1999 | Nakagawa et al. | 438/206 |
| 6,049,115 A | * 4/2000 | Takahashi et al. | 257/417 |
| 6,214,657 B1 | * 4/2001 | Iee | 438/219 |

FOREIGN PATENT DOCUMENTS

| | | |
|---|---|---|
| WO | WO 9212398 | 7/1992 |
| WO | WO 9429894 | 12/1994 |

* cited by examiner

Primary Examiner—Jack Berman
Assistant Examiner—Kalimah Fernandez
(74) Attorney, Agent, or Firm—Adams & Wilks

(57) ABSTRACT

A self-detecting type of SPM probe can eliminate influences of a leak current between piezo-resistors each other, between another piezo-resistors opposite to each other, or between the piezo-resistor and the other one, or of a carrier generated by irradiation of light thereto over the piezo-resistors by forming impurity diffusion layers each consisting of a conductive type (n⁻ well regions) reverse to a conductive type of a semiconductor substrate (p-type silicon substrate) on each interface between each of the piezo-resistors and the semiconductor substrate respectively to insulate the elements from one another.

15 Claims, 18 Drawing Sheets

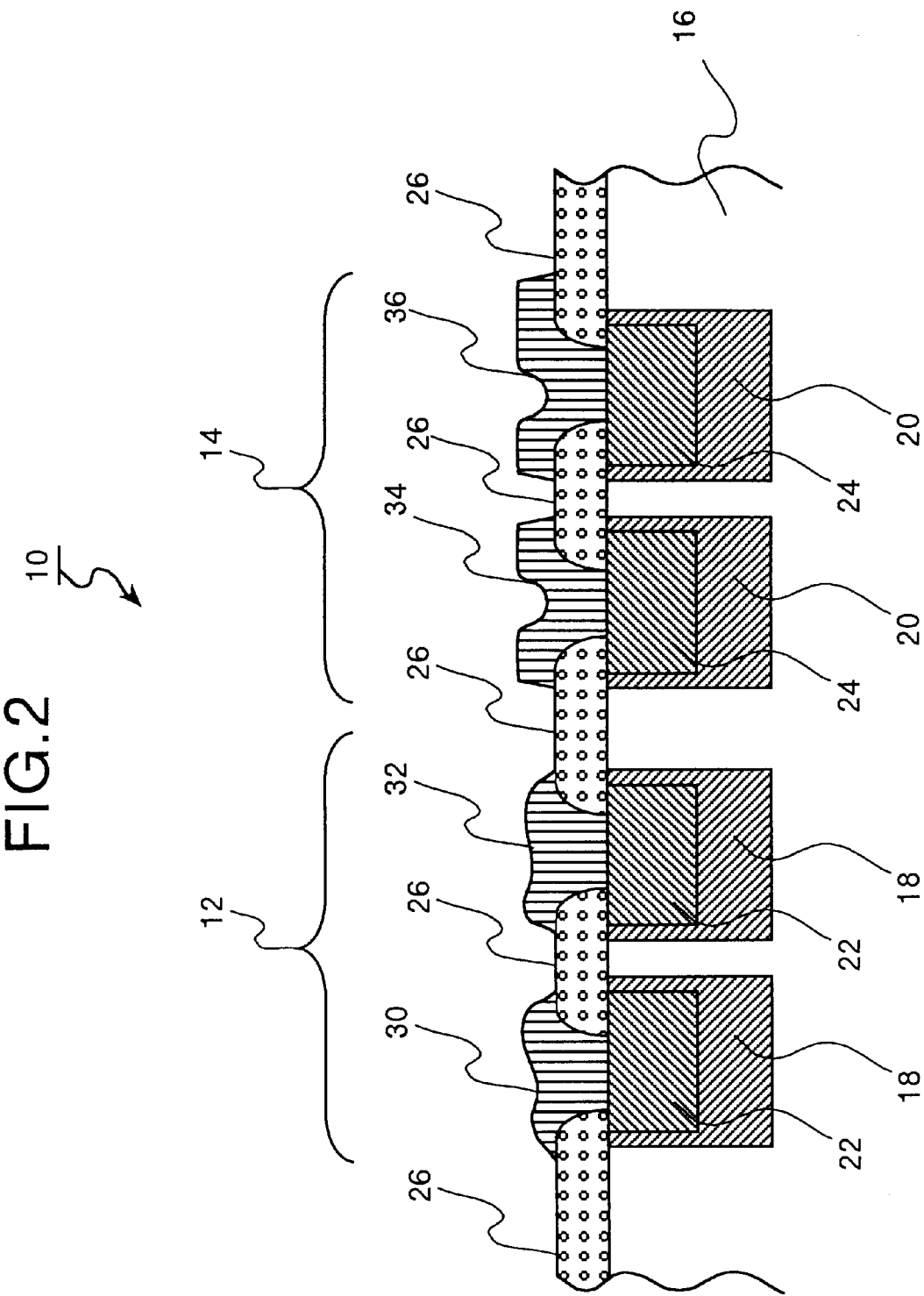

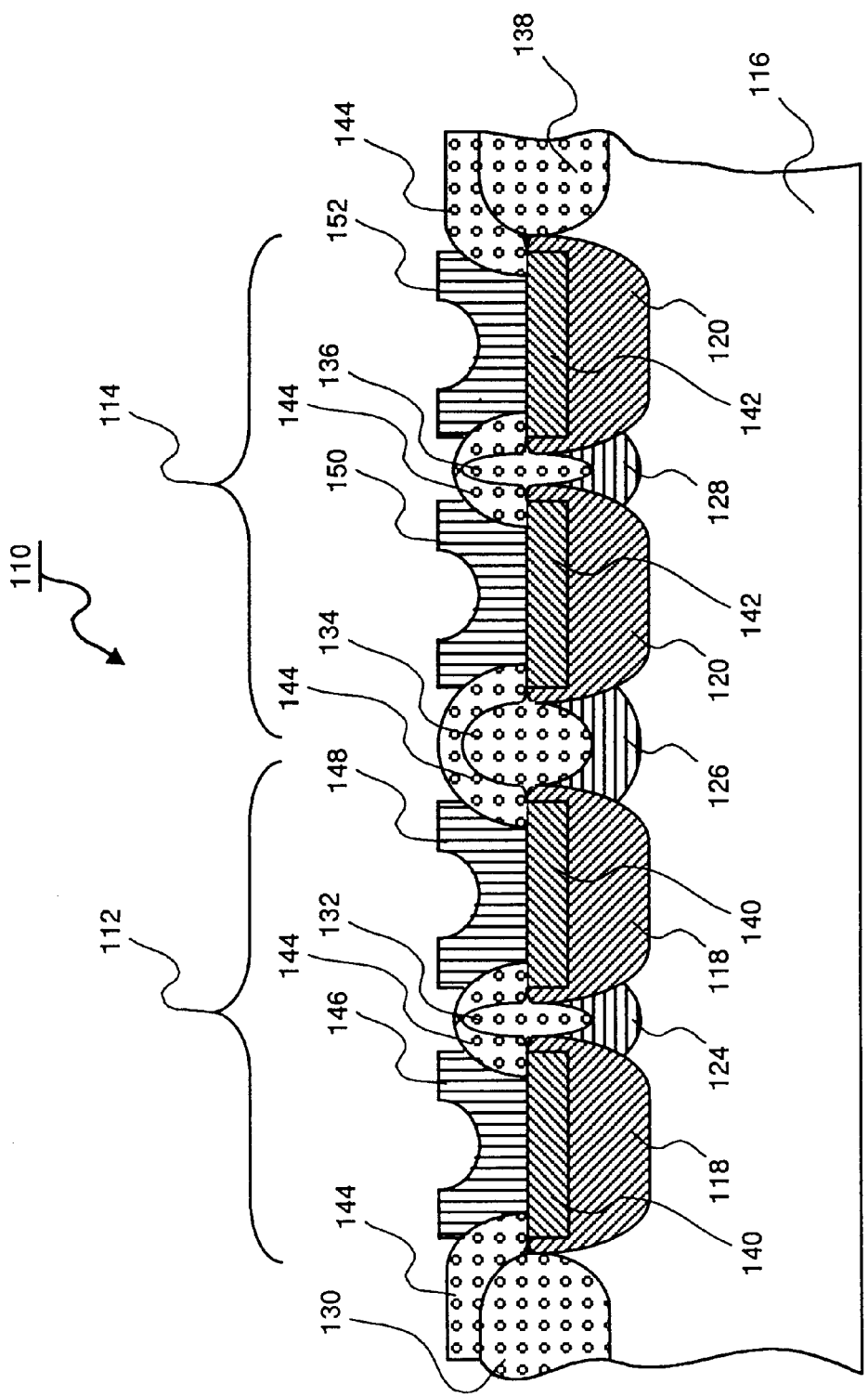

EXAMPLE OF COMPARISON

PRESENT INVENTION

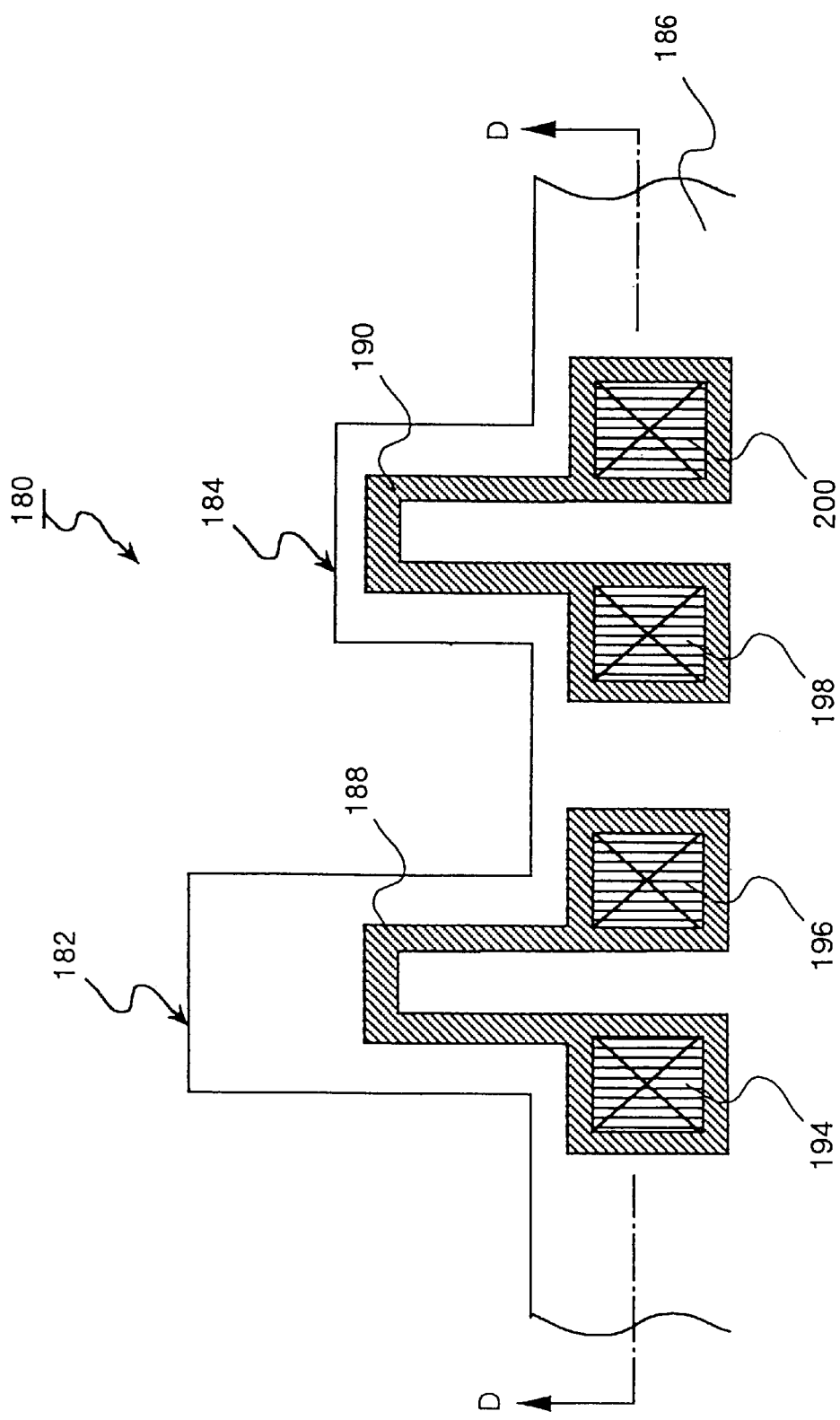

US 6,388,252 B1

SELF-DETECTING TYPE OF SPM PROBE AND SPM DEVICE

FIELD OF THE INVENTION

The present invention relates generally to a self-detecting type of SPM probe and, more specifically, to the structure of a self-detecting type of SPM probe using a cantilever type of SPM probe with U shaped piezo-resistors provided on a semiconductor substrate.

BACKGROUND OF THE INVENTION

The SPM (Scanning Probe Microscope) is used to find out the surface shape and change in physical characteristics of minute particles of the order of an atom in size. The SPM device uses an SPM probe with a tip provided at the end of a scanning probe. In the SPM device using the SPM probe described above, by scanning a surface of the sample with the tip provided at the edge of the probe, an interaction (such as an attractive force or repulsive force) is generated between the surface of the sample and the tip, and through detection of the amount of deflection of the SPM probe caused by the interaction, the shape of the surface of the sample is measured.

As for the amount of deflection of the SPM probe, a piezo-resistive probe with piezo-resistors formed on the surface of a semiconductor is provided and fluctuations in resistance are measured to detect the amount of deflection. The SPM probe as described above is referred to as a self-detecting type of SPM probe.

This self-detecting type of SPM probe based on the conventional technology is generally produced, as shown in FIG. 16 and FIG. 17, in a cantilever form. The SPM probe 180 in FIG. 17 comprises a cantilever 182 and a reference 184 for measuring a reference resistance value, and $p^+$ piezo-resistors 188 and 190 are formed on the cantilever 182 and the reference 184 respectively by selectively implanting p-type impurity ions in a U shape (Refer to FIG. 16) into the surface of an n-type silicon substrate 186.

Then, on the surface of the silicon substrate 186 a silicon oxide ($SiO_2$) film 192 is formed for protecting the surface excluding the metal contact sections of the cantilever 182 and the reference 184, and aluminum (Al) electrodes 194, 196, 198 and 200 for contacting are embedded in the metal contact sections respectively. It is assumed herein that p-type impurity ions are implanted into the surface of the n-type silicon substrate 186 to form $p^+$ piezo-resistors 188 and 190, but when a p-type silicon substrate is used, n-type impurity ions are implanted into the surface of the substrate to form $n^+$ piezo-resistors.

In the self-detecting type of SPM probe 180 based on the conventional technology, when the surface of a sample is scanned with the cantilever 182 of the scanning probe microscope with a tip provided at the edge thereof (not shown), an attractive force or a repulsive force according to an inter-atomic force is generated between the surface of the sample and the tip, resistance in the piezo-resistors 188 varies when the cantilever 182 deflects due to the inter-atomic force, and the amount of deflection of the cantilever 182 is detected according to the resistance variations. The variations in the resistance of the piezo-resistors 188 of the cantilever 182 are measured using the aluminum electrodes 194 and 196 of the metal contact sections.

Measurement of resistance values is made in the reference 184 concurrently with the operation described above. This measurement is made to provide reference resistance values for executing temperature compensation by using a Wheatstone bridge because a resistance value in a piezo-resistor itself varies according to ambient and other conditions (such as a temperature condition) rather than deflection caused by the sample.

Self-detecting type of SPM probe using a piezo-resistor is described in, for instance, Japanese Patent Laid-Open Publication No. HEI 5-196458, U.S. Pat. Nos. 5,444,244, and 5,345,815.

However, in the self-detecting type of SPM probe based on the conventional technology, the piezo-resistors 188, 190 of the cantilever 182 and the reference 184 are located in a U shape on the surface of the semiconductor substrate 186 so that current leakage occurs between the legs of the piezo-resistor opposite to each other with the semiconductor substrate 186 therebetween (e.g. between the legs of the resistors 188, between the legs of the resistors 190, and between the resistors 188 and 190), and variations in resistance in piezo-resistors can not be detected accurately.

In addition, when light is irradiated around the piezo-resistors 188, 190, carriers are generated on the surface of the semiconductor substrate 186, and noise occurs when resistance is measured, so that variations in the resistance in piezo-resistors can not be detected accurately.

The problem of light can be eliminated by covering each of the piezo-resistors with a light shielding material, but there is the problem that the object to be covered is extremely small and it is required that the cantilever 182 is deflectable along a shape of the surface of a sample, and for these reasons it is difficult to cover a piezo-resistor with a light-shielding material.

SUMMARY OF THE INVENTION

It is an object of the present invention to provide, for solving the problems described above, a self-detecting type of SPM probe which can prevent a current from leaking between adjacent legs of U-shaped piezo-resistors or between adjacent piezo-resistors through a semiconductor substrate and which can prevent noise from being generated due to the influence of carriers generated in response to irradiation of light over the resistors, and which can accurately detect the amount of deflection of a cantilever.

In accordance with one aspect of the present invention, an insulation processing is carried out on the semiconductor substrate between adjacent legs of U-shaped piezo-resistors to separate the elements from each other electrically, so that occurrence of a leak current or noise generated by carriers generated due to incident light can be prevented, which allows accurate detection of the amount of deflection of the cantilever.

In accordance with another aspect of the present invention, a reference with piezo-resistors is formed adjacent to a cantilever and insulation processing is also carried out on the semiconductor substrate between adjacent legs of the U-shaped piezo-resistor of the reference to separate the elements from each other electrically, so that occurrence of a leak current in a reference or noise generated by carriers produced due to incident light can be prevented, which allows an accurate detection of the amount of deflection of a cantilever.

In accordance with another aspect of the present invention, as the insulation processing, impurity diffusion layers each consisting of a conductive type reverse to that of the semiconductor substrate are formed in the space in the semiconductor substrate at least on the side that face each other of piezo-resistors located opposite to each other with the semiconductor substrate therebetween, and the elements are separated from one another electrically, so that occurrence of a leak current or noise generated by a carrier due to light can be prevented.

With the present invention, as the insulation processing, piezo-resistors are formed on semiconductor layers each formed in the same U shape as that of the resistor and an insulated layer is provided between the semiconductor layer and the semiconductor substrate to separate the elements from one another electrically, so that occurrence of a leak current or noise generated by a carrier due to light can be prevented.

With the present invention, as the insulation processing, impurity diffusion layers each consisting of a conductive type reverse to that of a semiconductor substrate are formed in each space in the semiconductor substrate at least on the sides that face each other of piezo-resistors located to each other with the semiconductor substrate therebetween, and insulators are also formed in the semiconductor substrate between the piezo-resistors opposite to each other to separate the elements from one another electrically, so that occurrence of a leak current or noise generated by a carrier due to light can be prevented.

With the present invention, above described probe with less leakage of light is used in the SPM device, so that, a light shielding mechanism that is conventionally required can be eliminated and noise due to leak current can be prevented, and high-efficiency measurement can be made.

Other objects and features of this invention will become clear from the following description with reference to the accompanying drawings.

BRIEF DESCRIPTION OF DRAWINGS

FIG. 2 is a cross-sectional view of the SPM probe taken along the line A—A in FIG. 1;

FIG. 10 is a cross-sectional view of the SPM probe taken along the line C—C in FIG. 9;

FIG. 14A shows an example of comparison and FIG. 14B shows a result according to the present invention;

FIG. 15A shows an example of comparison and FIG. 15B shows a result according to the present invention;

FIG. 16 is a plan view of a self-detecting type of SPM probe based on the conventional technology;

DESCRIPTION OF THE PREFERRED EMBODIMENTS

Detailed description is made hereinafter of preferred embodiments of the self-detecting SPM probe according to the present invention with reference to the attached drawings.

Figure 1:
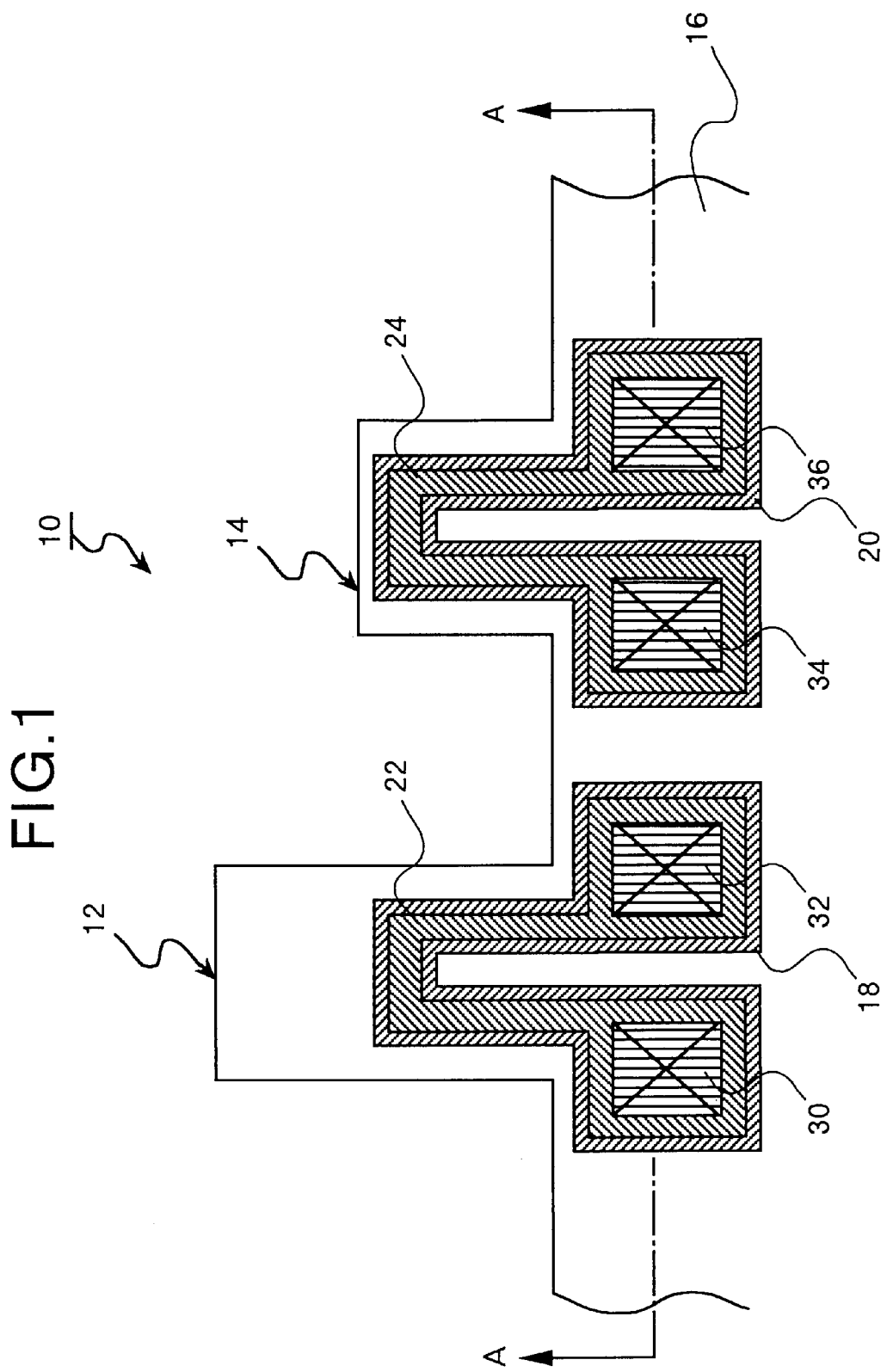
FIG. 1 is a plan view of a self-detecting type of SPM probe according to Embodiment 1 of the present invention.

FIG. 1 shows a plan view of a self-detecting type of SPM probe 10 according to Embodiment 1 of the present invention, and FIG. 2 shows a cross-sectional view of the SPM probe taken along the line A—A in FIG. 1.

In FIG. 1, the self-detecting type of SPM probe 10 comprises a cantilever 12 for scanning a surface of a sample to measure a shape of the surface of the sample, and a reference 14 for detecting a reference resistance value. Provided on a surface of a semiconductor substrate 16 in the side of the cantilever 12 is a U-shaped piezo-resistor 22, and in the side of the reference 14 is a U-shaped piezo-resistor 24 (e.g. $p^+$ piezo resistance area).

Embodiment 1 is characterized in that impurity diffusion layers 18, 20 each consisting of a conductive type (e.g. $n^-$ well region) reverse to the conductive type of the semiconductor substrate 16 (e.g. p-type silicon substrate) are formed at the interface between the piezo-resistors 22, 24 and the semiconductor substrate 16.

Resistance values in the piezo-resistors 22 and 24 are measured using the aluminum (Al) electrodes 30, 32 and 34, 36. Fluctuations in a resistance value between the electrodes 30 and 32 are detected in the cantilever 12, and a resistance value between the electrodes 34 and 36 is detected using the reference 14.

Looking at the structure shown in FIG. 2, which is a cross-sectional view of the SPM probe taken along the line A—A in FIG. 1, it can be understood that the U-shaped piezo-resistors 22 and 24 ($p^+$ piezo-resistance regions) are provided on the surface of the semiconductor substrate 16 (p-type silicon substrate) through the impurity diffusion layers 18 and 20 ($n^-$ well regions) respectively. As described above, the impurity diffusion layers 18, 20 each consisting of a conductive type ($n^-$ well region) reverse to that of the semiconductor substrate 16 are provided between the semiconductor substrate 16 (p-type silicon substrate) and the piezo-resistors 22, 24 ($p^+$ piezo-resistance regions), so that the impurity diffusion layers 18, 20 act as insulators.

For this reason, a current does not leak between the piezo-resistors 22 and 24 mutually or between the legs of the piezo-resistors 22 and 24, and also movement of electrons is restricted by the impurity diffusion layers 18, 20 even though carriers are generated on the surface of the semiconductor substrate 16 due to irradiation of light around the piezo-resistors 22, 24, and for this reason occurrence of noise (interference due to light) can be prevented.

Description is made of steps of a process for forming the impurity diffusion layer 18 shown in FIG. 2 with reference to FIGS. 3A to 3E and FIGS. 4F to 4I. It should be noted that FIGS. 3A to 3E and FIGS. 4F to 4I show cross sections of steps of forming the impurity diffusion layer 18 in one of the piezo-resistor 22 of the cantilever 12 in FIG. 2, and the same reference numerals are assigned to elements corresponding to those in FIG. 2.

Figure 3A:
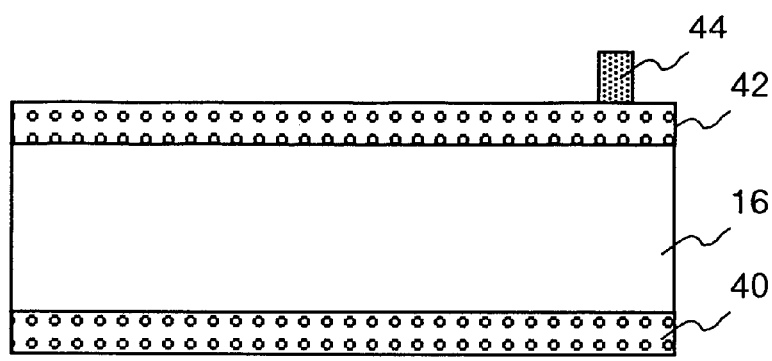
FIG. 3A to FIG. 3E are views for explaining steps of forming the self-detecting type of SPM probe according to Embodiment 1.

As shown in FIG. 3A, silicon oxide ($SiO_2$) films 40, 42 each with a specified thickness are formed on the rear and top surfaces of the semiconductor substrate 16 consisting of a p-type silicon substrate, and a photoresist film 44 as an etching mask is patterned on the silicon oxide film 42 to form a tip of the cantilever.

Figure 3B:
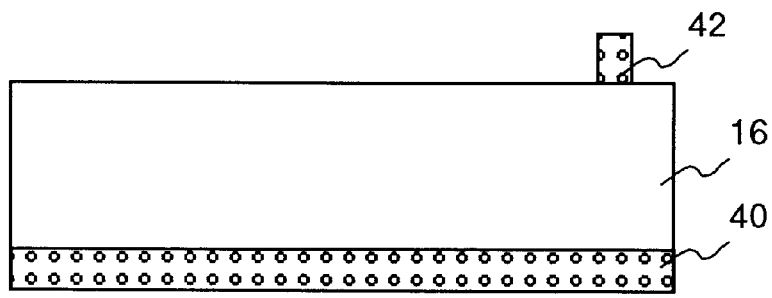

By etching the silicon substrate 16 on which this photoresist film 44 is formed as a mask with a solution of buffered hydrofluoric acid, the silicon oxide film 42 which becomes a mask to form a tip is patterned (Refer to FIG. 3B).

Figure 3C:
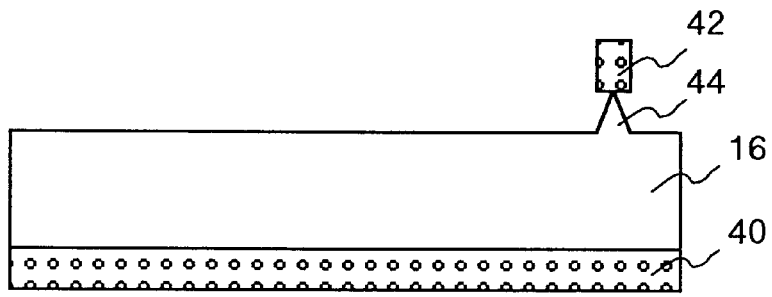

Then, by subjecting reactive ion etching (RIE) to the substrate with this silicon oxide film 42 as a mask, a sharp-pointed tip 44 is formed under the mask 42 (Refer to FIG. 3C).

Figure 3D:
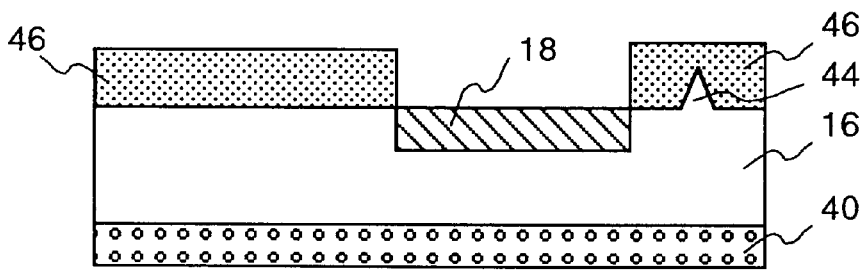

As shown in FIG. 3D, an impurity diffusion layer 18 is formed by forming a photoresist film 46 with a region for the impurity diffusion region 18 to be formed opened on the surface of the semiconductor substrate 16 based on photolithography technology and ion-implanting group V elements such as phosphorus (P) for forming an $n^-$ well region.

Figure 3E:
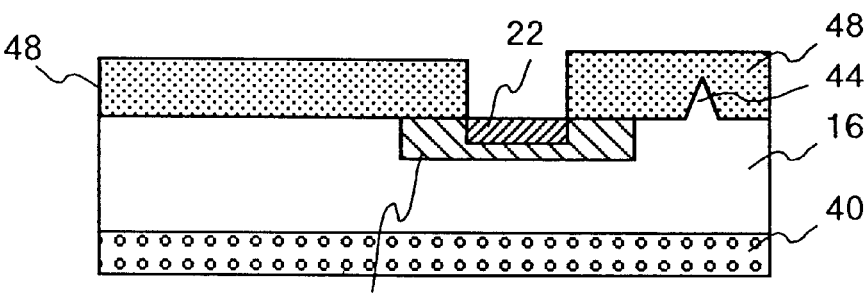

As shown in FIG. 3E, a piezo-resistor 22 is formed inside the impurity diffusion layer 18 by forming a photoresist film 48 with a region for the piezo-resistor 22 to be formed in the impurity diffusion layer 18 opened thereon and ion-implanting to form a $p^+$ piezo-resistance region.

Figure 4F:
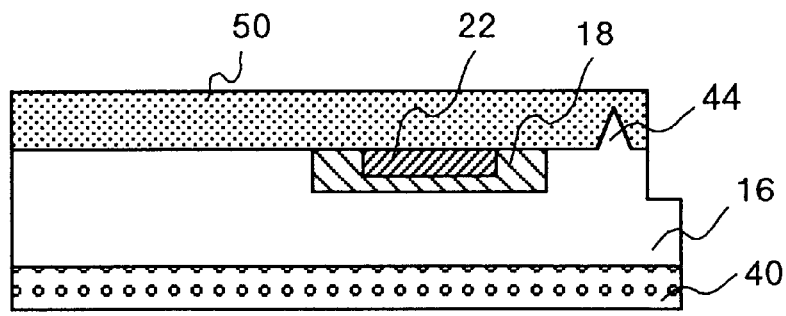
FIG. 4F to FIG. 4I are views for explaining steps of forming the self-detecting type of SPM probe according to Embodiment 1.

Then, as shown in FIG. 4F, a photoresist film 50 is formed in order to form an edge section of a cantilever, anisotropic etching is subjected to the semiconductor substrate 16 with the film as a mask up to at least the same depth as a thickness of the cantilever according to RIE, and then the edge section of the cantilever is formed.

Figure 4G:
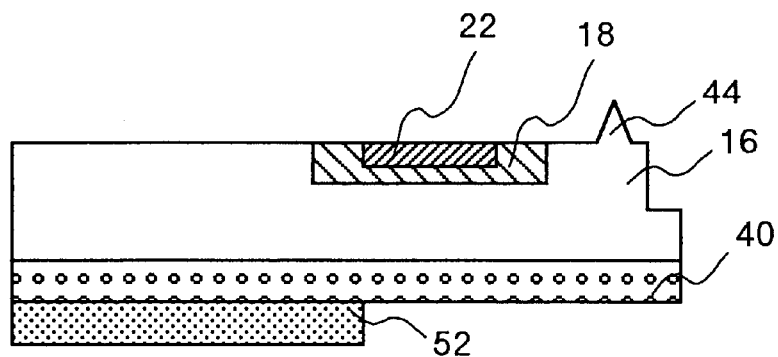

AS shown in FIG. 4G, the photoresist film 50 is removed from the surface of the substrate, a photoresist film 52 as an etching mask is formed under the silicon oxide film 40 on the rear surface, back etching is subjected to the film 40 with the photoresist film 52 as a mask by using a solution of buffered hydrofluoric acid (BHF), and then the silicon oxide film 40 is patterned.

Figure 4H:
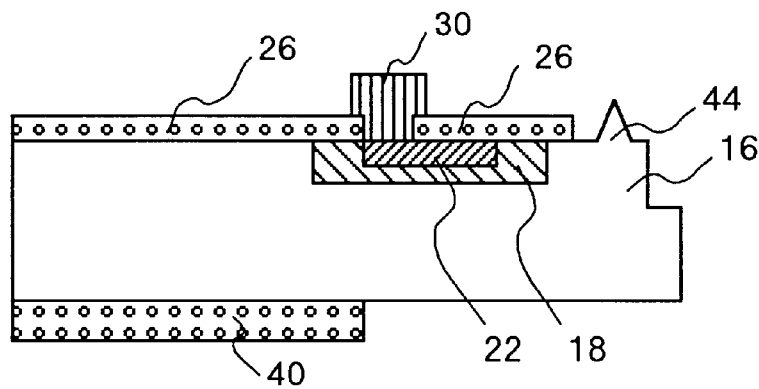

AS shown in FIG. 4H, a portion excluding a metal contact section of the piezo-resistor 22 as well as a tip 44 on the semiconductor substrate 16 is covered with a silicon oxide film 26 to protect the surface thereof, and aluminum is embedded in the metal contact section to form an electrode 30.

Figure 4I:
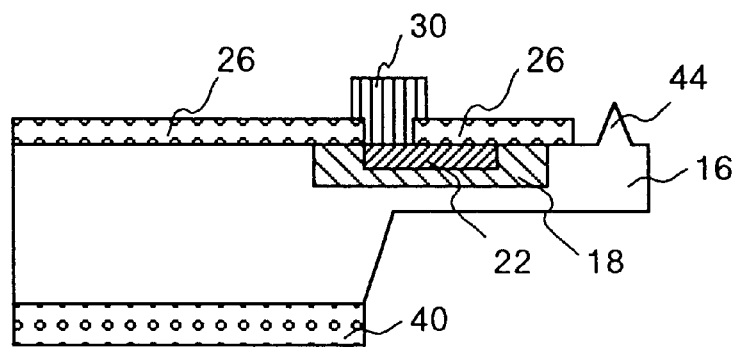

Then, as shown in FIG. 4I, the rear surface of the semiconductor substrate 16 is partially removed by subjecting back etching thereto by using a solution of 40% potassium hydroxide ($KOH+H_2O$) with the silicon oxide film 40 having been patterned as a mask in FIG. 4G, and then a flexible cantilever with a specified thickness is formed extending from a base portion having a larger thickness than the flexible cantilever.

As described above, according to Embodiment 1, impurity diffusion layers 18 each having a conductivity type reverse to that of the semiconductor substrate are formed around the adjacent legs of the U-shaped piezo-resistors with the semiconductor substrate 16 therebetween, so that the legs are separated with insulation, and a leak current between the piezo-resistors or noise due to carriers generated by irradiation of light can be prevented, which allows an accurate detection of the amount of deflection of the cantilever.

It should be noted that the invention according to Embodiment 1 has a p-type silicon substrate for the semiconductor substrate 16, $p^+$ piezo-resistance regions for the piezo-resistors 22 and 24, and $n^-$ well regions for the impurity diffusion layers 18 and 20, but may be each conductive type reverse to the above type, it may comprise an n-type so that silicon substrate for the semiconductor substrate 16, $n^+$ piezo-resistance regions for the piezo-resistors 22 and 24, and $p^-$ well regions for the impurity diffusion layers 18 and 20.

Figure 5:
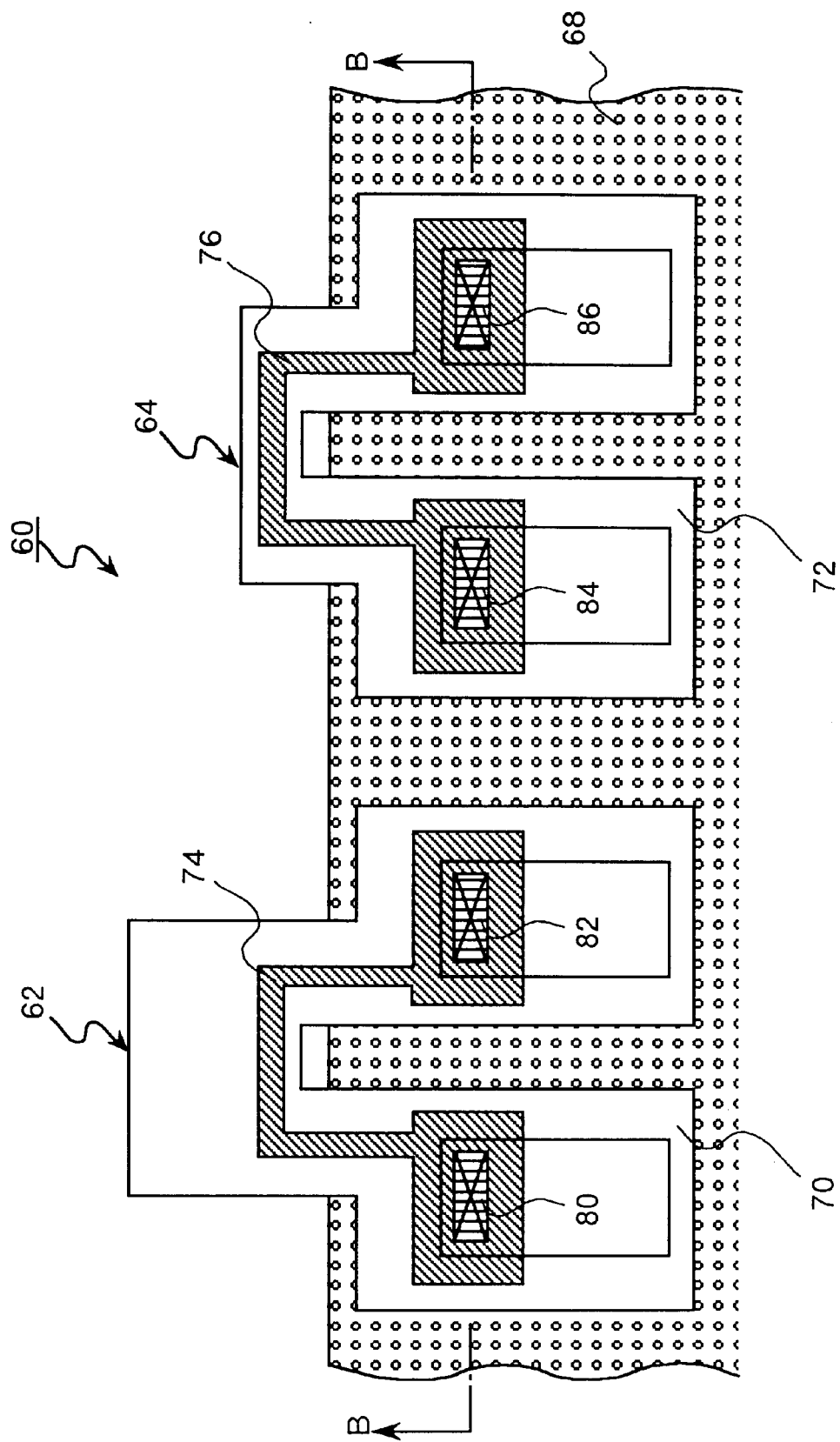
FIG. 5 is a plan view of a self-detecting type of SPM probe according to Embodiment 2 of the present invention.
Figure 6:
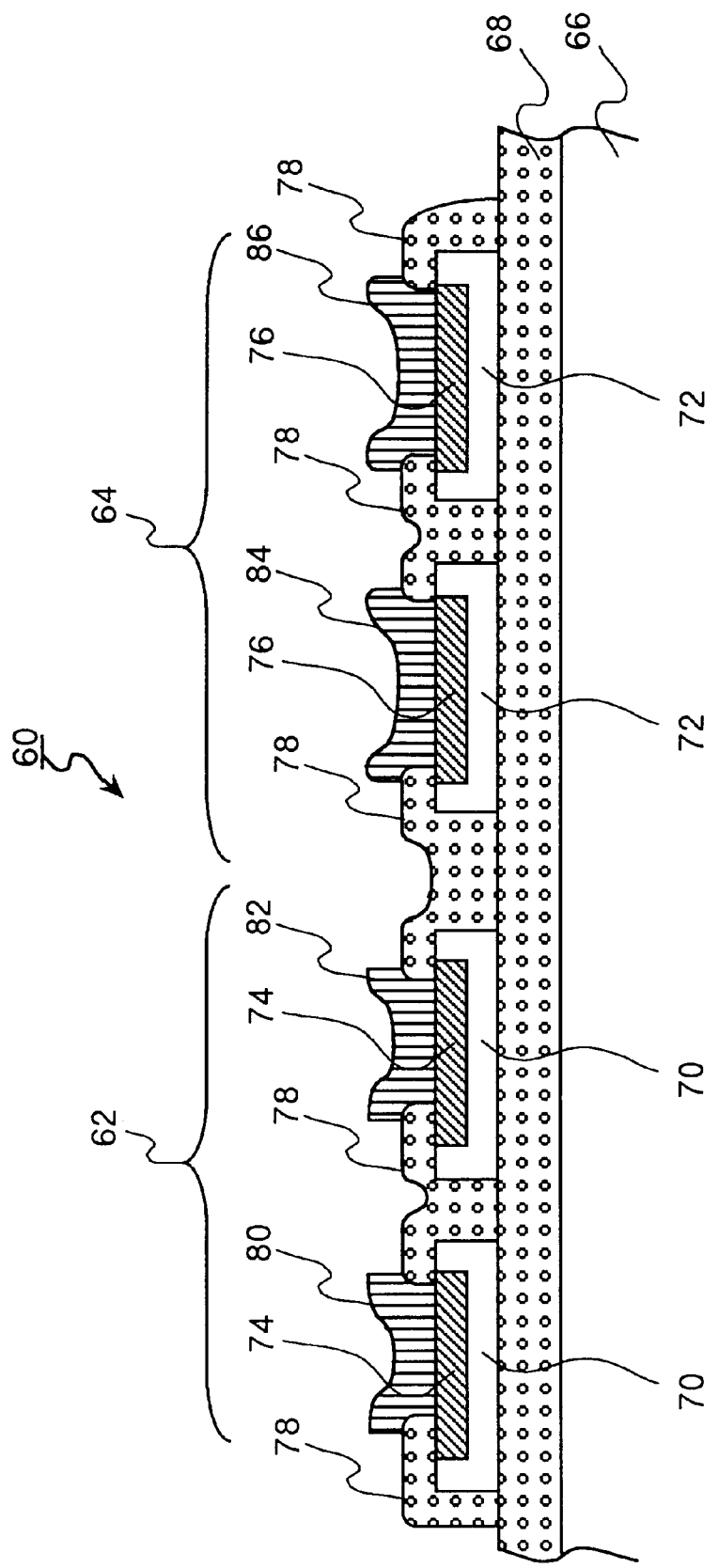
FIG. 6 is a cross-sectional view of the SPM probe taken along the line B—B in FIG. 5.

FIG. 5 shows a plan view of a self-detecting type of SPM probe 60 according to Embodiment 2 of the present invention and FIG. 6 shows a cross-sectional view of the SPM probe taken along the line B—B in FIG. 5.

In FIG. 5, the self-detecting type of SPM probe 60 comprises a cantilever 62 for scanning a surface of a sample to measure a shape of the surface of the sample, and a reference 64 for detecting a reference resistance value.

Embodiment 2 is characterized, as shown in FIG. 6, in that, elements are separated by insulating U-shaped piezo-resistors from one another by using SOI (Silicon on Insulator) technology in which an embedded oxide layer ($SiO_2$) 68 is formed on a semiconductor substrate 66 made of silicon and further, silicon layers 70, 72 are thermally adhered thereon.

Namely, as shown in FIG. 5 and FIG. 6, embedded oxide layer 68 is formed on the semiconductor substrate 66, and U-shaped piezo-resistors 74, 76 are further formed on U-shaped SOI silicon layers 70, 72 formed on the embedded oxide layer 68. For this reason, space between the adjacent legs of the piezo-resistors 74 or between the piezo-resistors 74 and 76 adjacent to each other is insulated with the embedded oxide layer 68 as well as with an oxide layer 78, so that the piezo-resistors are not affected by a leak current between the piezo-resistors or by noise due to occurrence of a carrier therebetween.

Description is made for steps of forming the self-detecting type of SPM probe 60 for separating elements according to the SOI islands shown in FIG. 6 with reference to FIGS. 7A to 7D and FIGS. 8E to 8H. It should be noted that FIGS. 7A to 7D and FIGS. 8E to 8H show cross sections of steps of forming one of the piezo-resistor 74 of the cantilever 62 in FIG. 6, and the same reference numerals are assigned to sections corresponding to those in FIG. 6.

Figure 7A:
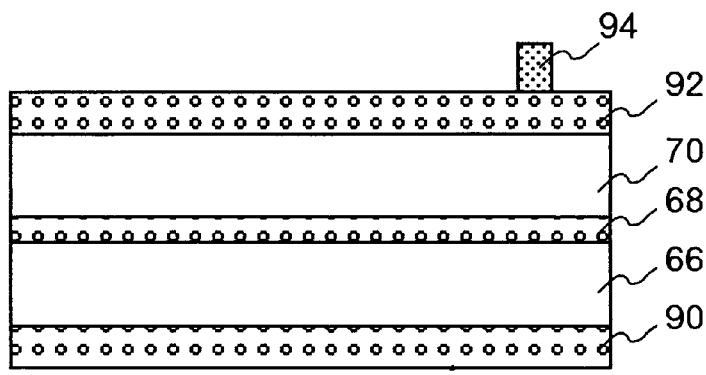
FIG. 7A to FIG. 7D are views for explaining steps of forming the self-detecting type of SPM probe according to Embodiment 2.

As shown in FIG. 7A, an SOI substrate having a sandwich structure obtained by forming the embedded oxide layer 68 on the semiconductor substrate 66 comprising a silicon substrate and further thermally adhering an SOI silicon layer 70 on the embedded oxide layer 68 is formed. Then, silicon oxide films 90, 92 are formed by thermally oxidizing the top and rear surfaces of the SOI substrate, and a photoresist film 94 as an etching mask is patterned on the silicon oxide film 92.

Figure 7B:
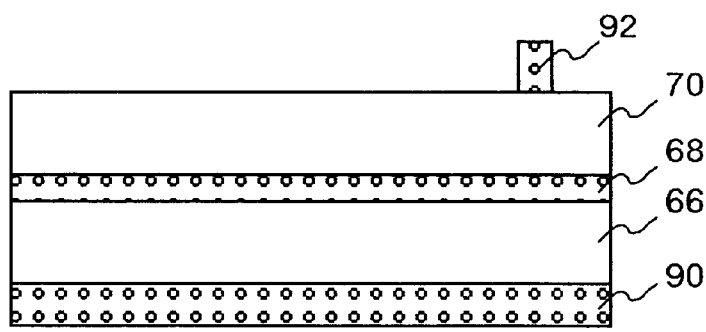

Then, as shown in FIG. 7B, by performing wet etching of the silicon oxide film 92 with a solution of buffered hydrofluoric acid (BHF) with this photoresist film 94 as a mask, the silicon oxide film 92 which becomes a mask for forming a tip is patterned.

Figure 7C:
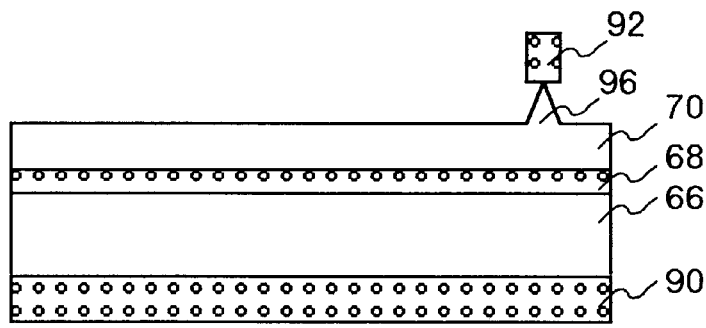

Then, by performing reactive ion etching (RIE) of the silicon layer with this silicon oxide film 92 as a mask, a sharp-pointed tip 96 is formed under the mask 92 (Refer to FIG. 7C).

Figure 7D:
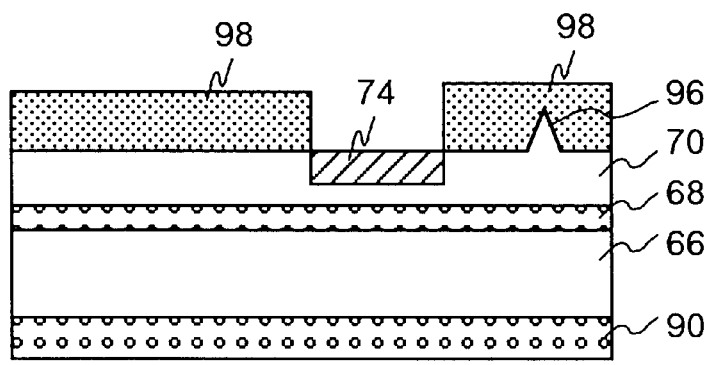

Further, as shown in FIG. 7D, a piezo-resistor 74 can be formed inside the SOI silicon layer 70 by forming a photoresist film 98 with a region for the piezo-resistor to be formed opened on the surface of the semiconductor substrate 66 and forming a $p^+$ piezo-resistance region by ion-implanting therein.

Figure 8E:
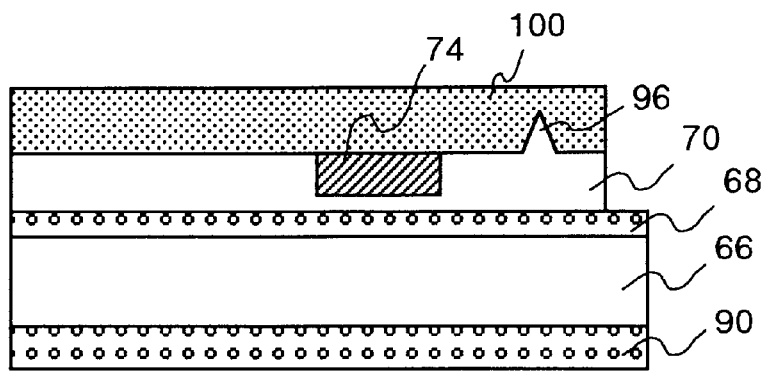
FIG. 8E to FIG. 8H are views for explaining steps of forming the self-detecting type of SPM probe according to Embodiment 2.

As shown in FIG. 8E, a cantilever-formed photoresist film 100 is formed on the SOI silicon layer 70 in order to form an edge section of the cantilever, etching is subjected to the SOI silicon layer 70 just in front of the embedded oxide layer 68 according to RIE with the photoresist film 100 as a mask, and then the edge section of the cantilever is formed.

Figure 8F:
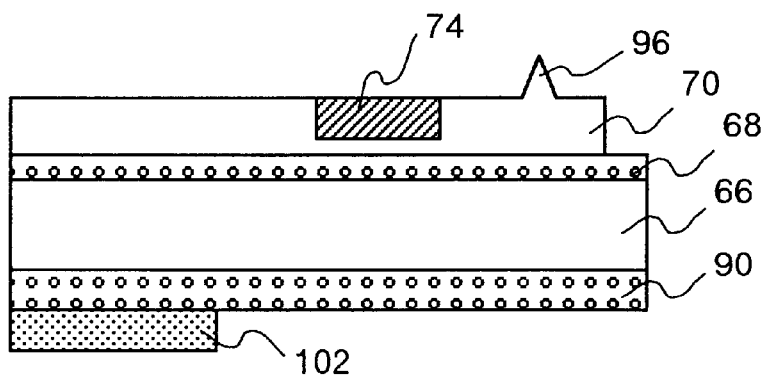

As shown in FIG. 8F, the photoresist film 100 is removed from the surface of the substrate, a photoresist film 102 as an etching mask is formed under the silicon oxide film 90 on the rear surface, back etching is subjected to the film 90 with the photoresist film 102 as a mask by using a solution of buffered hydrofluoric acid (BHF), and then the silicon oxide film 90 is patterned.

Figure 8G:
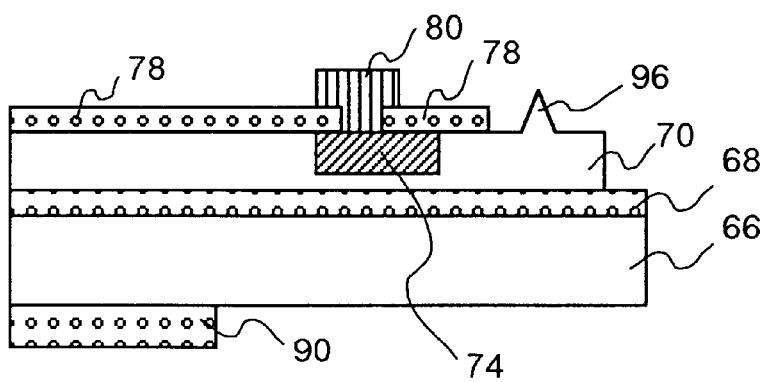

As shown in FIG. 8G, a portion excluding a metal contact section of the piezo-resistor 74 as well as a tip 96 on the SOI silicon layer 70 is covered with a silicon oxide film 78 to protect the surface thereof, and aluminum is embedded in the metal contact section to form an electrode 80.

Figure 8H:
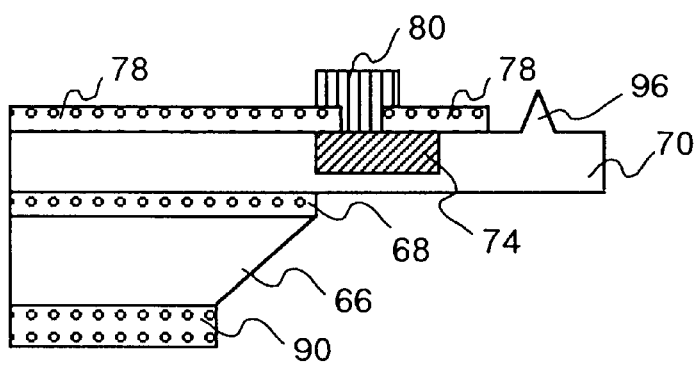

Further, as shown in FIG. 8H, the semiconductor substrate 66 and the embedded oxide layer 68 are partially removed by subjecting back etching thereto by using a solution of 40% potassium hydroxide (KOH+H$_2$O) with the silicon oxide film 90 having been patterned as a mask in FIG. 8G, and then a cantilever consisting of the SOI silicon layer 70 with the piezo-resistor 74 provided therein is formed.

As described above, according to Embodiment 2, the U-shaped piezo-resistors 74 and 76 provided on the cantilever 62 and the reference 64 are formed by forming the embedded oxide layer 68 on the semiconductor substrate 66 and implanting impurity ions into the surface of the U-shaped SOI silicon layers 70, 72 further formed on the layer 68, so that insulation can surely be obtained between the adjacent legs of the piezo-resistor 74, between the adjacent legs of the piezo-resistor 76, or between the piezo-resistors 74 and 76 to separate the elements from one another, and for this reason a leak current between the piezo-resistors or noise due to a carrier generated by irradiation of light can be prevented, which allows an accurate detection of the amount of deflection of the cantilever.

Figure 9:
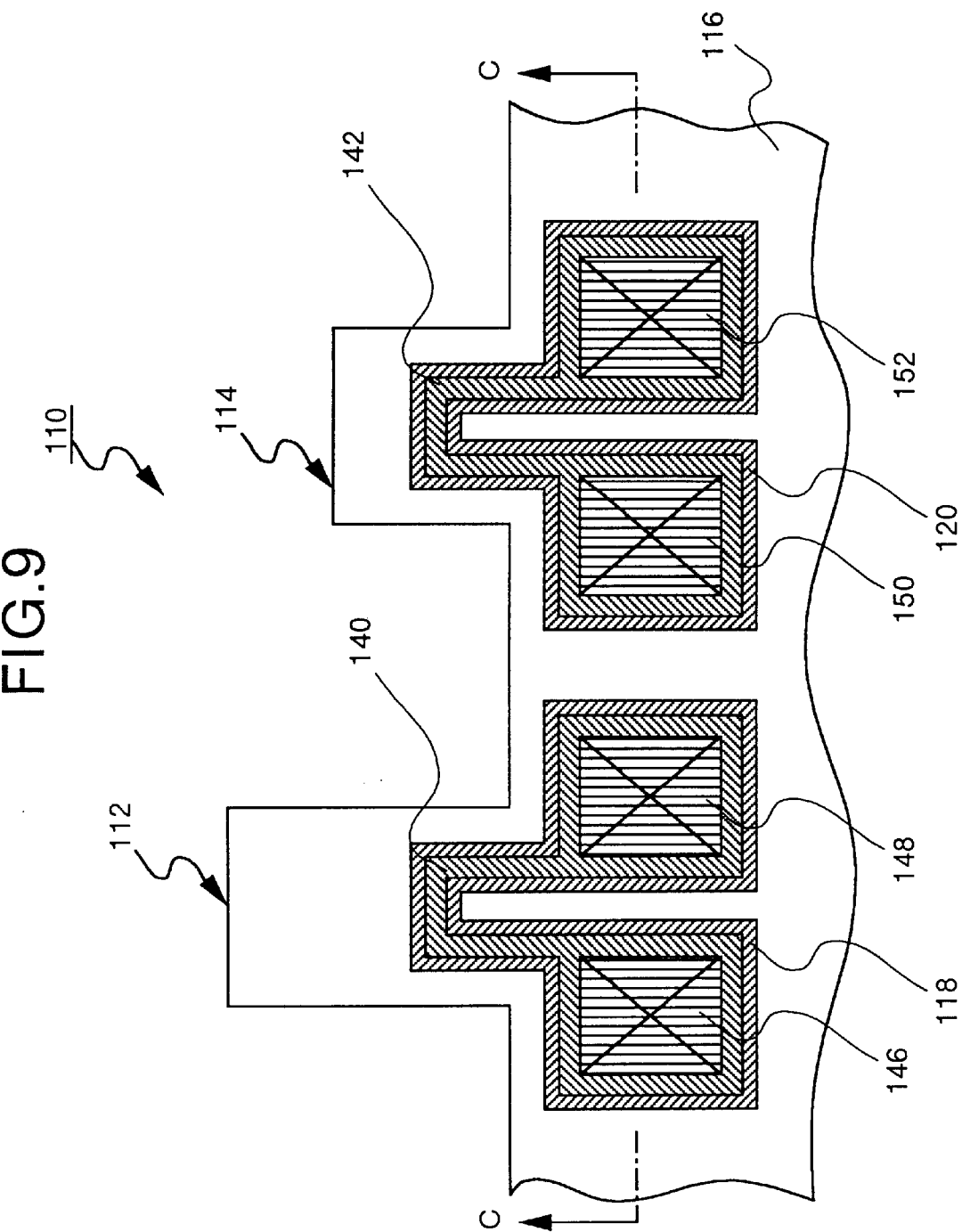
FIG. 9 is a plan view of a self-detecting type of SPM probe according to Embodiment 3 of the present invention.

FIG. 9 shows a plan view of a self-detecting type of SPM probe 110 according to Embodiment 3 of the present invention, and FIG. 10 shows a cross-sectional view of the SPM probe taken along the line C—C in FIG. 9.

In FIG. 9, the self-detecting type of SPM probe 110 comprises a cantilever 112 for scanning a surface of a sample to measure a shape of the surface of the sample, and a reference 114 for detecting a reference resistance value. Provided on a surface of a semiconductor substrate 116 in the side of the cantilever 112 is a U-shaped piezo-resistor 140, and the side of the reference 114 is a U-shaped piezo-resistor 142 (e.g. $p^+$ piezo resistance area).

Embodiment 3 is characterized in that impurity diffusion layers 118, 120 each consisting of a conductive type (e.g. $n^-$ well region) reverse to the conductive type of the semiconductor substrate 116 (e.g. p-type silicone substrate) are formed in between the piezo-resistors 140, 142 and the semiconductor substrate 116, and that the elements are separated by executing insulation in between the piezo-resistors 140 located facing each other, between the piezo-resistors 142, and between the piezo-resistors 140 and 142.

Resistance values in the piezo-resistors 140 and 142 are measured using aluminum electrodes 146, 148 and 150, 152. Fluctuations in a resistance value between the electrodes 146 and 148 are detected in the cantilever 112, and a resistance value between the electrodes 150 and 152 is detected using the reference 114.

Looking at the structure in FIG. 10 which is a cross-sectional view of the SPM probe taken along the line C—C in FIG. 9, it can be understood that the U-shaped piezo-resistors 140 and 142 ($p^+$ piezo-resistance regions) are provided near the surface of the semiconductor substrate 116 (p-type silicon substrate) through the impurity diffusion layers 118 and 120 ($n^-$ well regions) respectively. As described above, the impurity diffusion layers 118, 120 consisting of the conductive type ($n^-$ well region) reverse to that of the semiconductor substrate 116 are provided between the semiconductor substrate 116 (p-type silicon substrate) and the piezo-resistors 140, 142 ($p^+$ piezo-resistance regions), so that those impurity diffusion layers 118, 120 act as insulators.

Further, in Embodiment 3, silicon oxide films 132, 134, and 136 as insulators are formed in addition to the impurity diffusion layers 118, 120 by using a LOCOS (Local Oxidation of Silicon) method between the piezo-resistors 140, between the piezo-resistors 142, or between the piezo-resistors 140 and 142, and p± impurity diffusion regions 124, 126 and 128 to prevent a leak current due to its sneaking to the lower side of each of the silicon oxide films 132, 134, and 136 are formed therebetween.

For this reason, insulation can surely be obtained between the piezo-resistors 140, between the piezo-resistors 142, or between the piezo-resistors 140 and 142 to separate the elements, so that occurrence of a leak current or of noise (interference due to light) due to a carrier generated by irradiation of light to the resistors can surely be prevented.

Description is made for steps of forming the cantilever 112 of the self-detecting type of SPM probe shown in FIG. 10 with reference to FIGS. 11A–11D to FIGS. 13I–13K. It should be noted that FIGS. 11A–11D to FIGS. 13I–13K show cross sections of steps in one of the piezo-resistors 140 of the cantilever 112 in FIG. 10, and the same reference numerals are assigned to sections corresponding to those in FIG. 10.

Figure 11A:
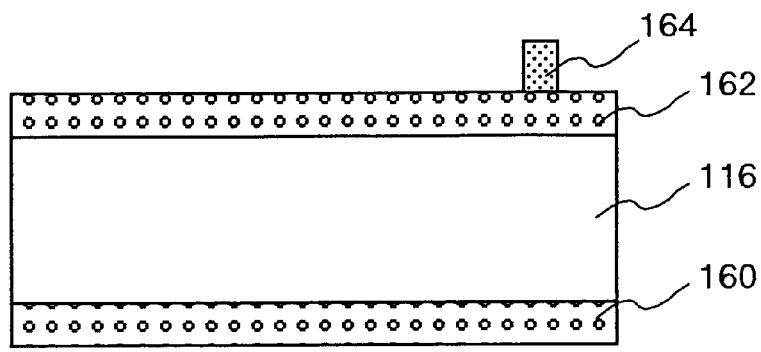
FIG. 11A to FIG. 11D are views for explaining steps of forming the self-detecting type of SPM probe according to Embodiment 3.

As shown in FIG. 11A, silicon oxide films 160, 162 each with a specified thickness are formed on the rear and top surfaces of the semiconductor substrate 116 consisting of a p-type silicon substrate, and a photoresist film 164 as an etching mask is patterned on the silicon oxide film 162 to form a tip of the cantilever thereon by using photolithography technology.

Figure 11B:
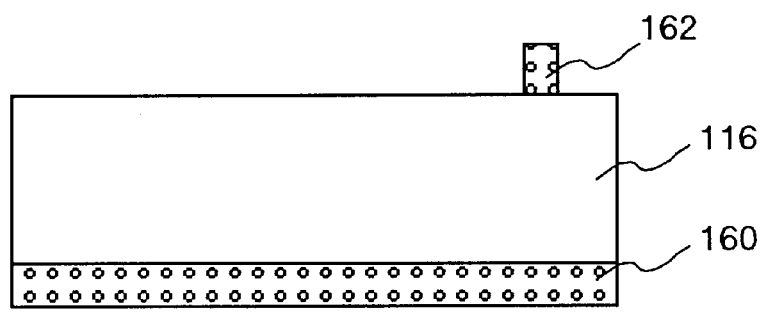

Then, by etching the silicon substrate 116 on which this photoresist film 164 is formed as a mask with a solution of buffering hydrofluoric acid, the silicon oxide film 162 which becomes a mask to form a tip is patterned (Refer to FIG. 11B).

Figure 11C:
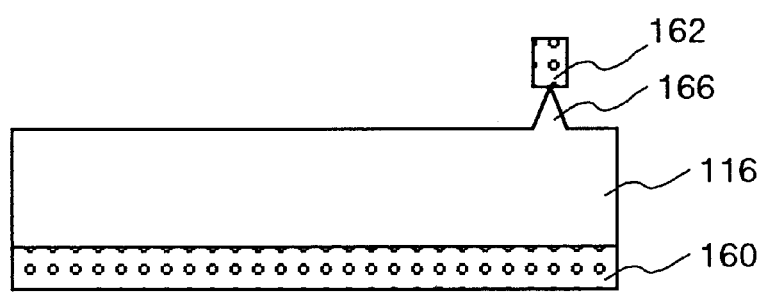

Then, by subjecting reactive ion etching (RIE) to the substrate with this silicon oxide film 162 as a mask, a sharp-pointed tip 166 is formed under the mask 162 (Refer to FIG. 11C).

Figure 11D:
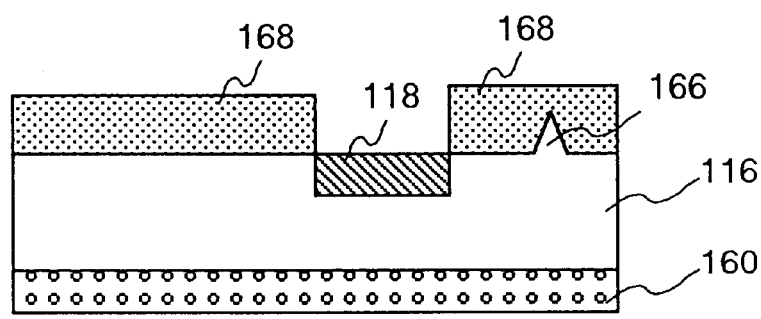

As shown in FIG. 11D, an impurity diffusion layer 118 is formed by forming a photoresist film 168 for form the impurity diffusion layer 118 on the surface of the semiconductor substrate 116 and ion-implanting V-group elements such as phosphorus (P) for forming an n⁻ well region.

Figure 12E:
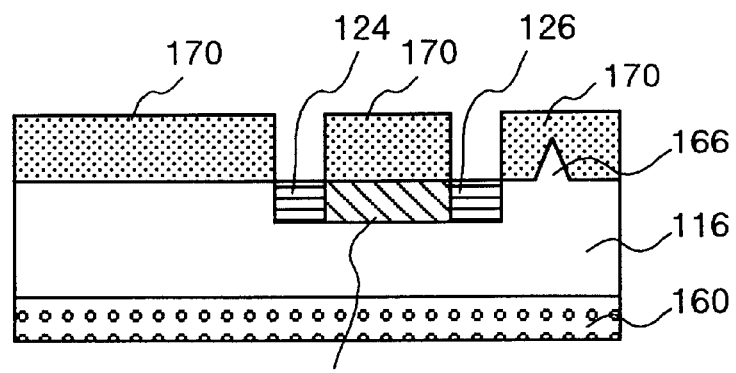
FIG. 12E to FIG. 12H are views for explaining steps of forming the self-detecting type of SPM probe according to Embodiment 3.

As shown in FIG. 12E, impurity diffusion regions 124, 126 are formed by forming a photoresist film 170 to form the impurity diffusion regions 124, 126 for separating the elements at both edge sections of the impurity diffusion layer 118 and ion-implanting III-group elements such as boron (B) to form p± piezo-resistance regions.

Figure 12F:
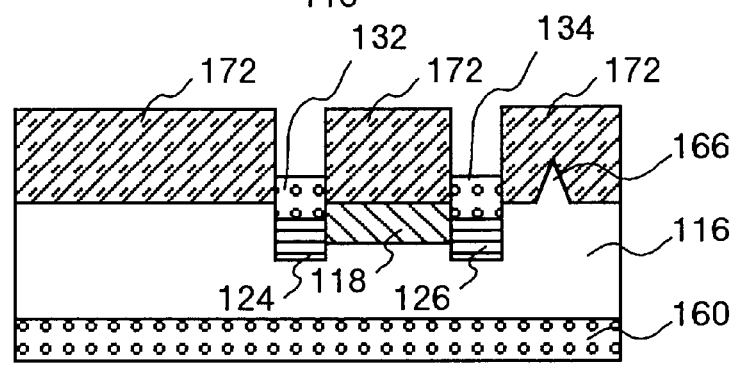

Then, as shown in FIG. 12F, in order to form silicon oxide films as insulators used for separating elements at both edge sections of the impurity diffusion layer 118 by using the LOCOS method, the substrate excluding regions to form the films thereon is covered with a silicon nitride (Si₃N₄) film 172 and then thermally oxidized, so that silicon oxide films 132, 134 are formed by growth.

Figure 12G:
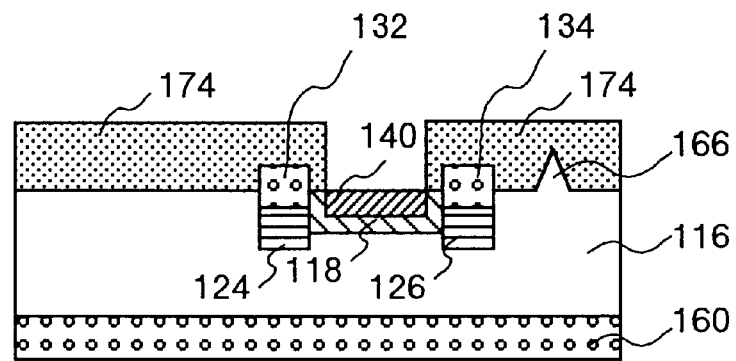

As shown in FIG. 12G, after the silicon nitride film 172 is removed, a photoresist film 174 with a open region for forming a piezo-resistor inside the impurity diffusion layer 118 is formed, and a p⁺ piezo-resistance region is formed with this photoresist film 174 as a mask by ion-implanting therein, and then a piezo-resistor 140 is formed on the impurity diffusion layer 118.

Figure 12H:
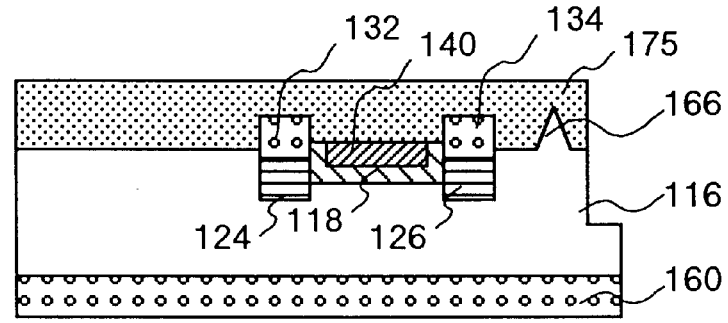

As shown in FIG. 12H, a photoresist film 175 is formed in order to form an edge section of a cantilever on the top surface of the semiconductor substrate 116, anisotropy etching is subjected to the semiconductor substrate 116 with the film as a mask up to at least the same depth as a thickness of the cantilever according to RIE, and then the edge section of the cantilever is formed.

Figure 13I:
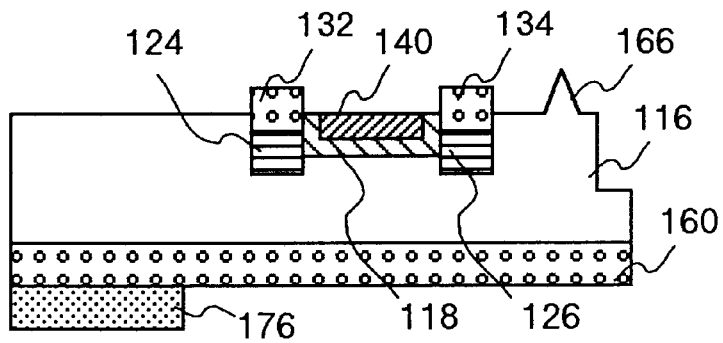
FIG. 13I to FIG. 13K are views for explaining steps of forming the self-detecting type of SPM probe according to Embodiment 3.

As shown in FIG. 13I, the photoresist film 175 is removed from the surface of the substrate, a photoresist film 176 as an etching mask is formed under the silicon oxide film 160 on the rear surface, back etching is subjected to the film 160 with the photoresist film 176 as a mask by using a solution of buffering hydrofluoric acid (BHF), and then the silicon oxide film 160 is patterned.

Figure 13J:
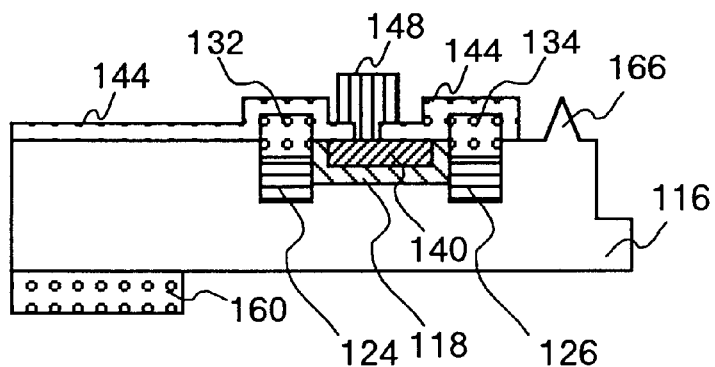

As shown in FIG. 13J, a portion excluding a metal contact section of the piezo-resistor 140 as well as a tip 166 on the semiconductor substrate 116 is covered with a silicon oxide film 144 to protect the surface thereof, and aluminum is embedded in the metal contact section to form an electrode 148.

Figure 13K:
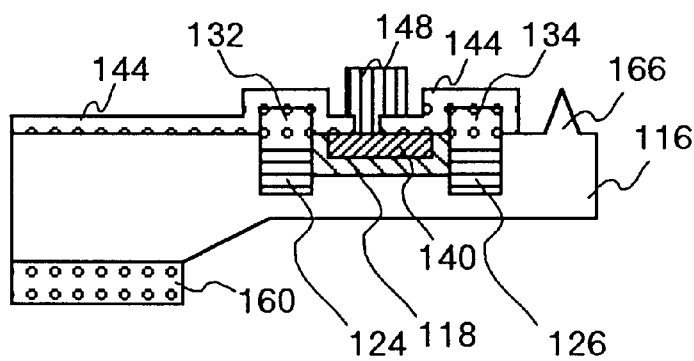

Then, as shown in FIG. 13K, the rear surface of the semiconductor substrate 116 is partially removed by subjecting back etching thereto by using a solution of 40% potassium hydroxide (KOH+H₂O) with the silicon oxide film 160 having been patterned as a mask in FIG. 12J, and then a flexible cantilever with a specified thickness can be formed.

As described above, according to Embodiment 3, the impurity diffusion layers 118 each consisting of the conductive type reverse to that of the semiconductor substrate are formed around the U-shaped piezo-resistors located opposite to each other with the semiconductor substrate 116 therebetween respectively, so that the elements are separated with insulation.

Also, the silicon oxide films 132, 134 and 136 for element separation are formed between the piezo-resistors 140 opposite to each other, between the piezo-resistors 142 opposite to each other, or between the piezo-resistors 140 and 142, and also the impurity diffusion regions 124, 126, and 128 each consisting of the conductive type (p± regions) reverse to the conductive type (n⁻ regions) of the impurity diffusion layers 118 and 120 are formed in each lower region of the silicon oxide films 132, 134, and 136, and for this reason, sneaking of a leak current can be prevented, and occurrence of a leak current or of noise due to a carrier generated by irradiation of light to the element when measurement is carried out can also be prevented, which allows an accurate detection of the amount of deflection of the cantilever.

It should be noted that the invention according to Embodiment 3 has comprised a p-type silicon substrate for the semiconductor substrate 116, p⁺ piezo-resistance regions for the piezo-resistors 140 and 142, n⁻ regions for the impurity diffusion layers 118 and 120, and p± regions for the purity diffusion regions 124, 126, and 128, but as each conductive type reverse to the above type, it may comprise an n-type silicon substrate for the semiconductor substrate 116, n⁺ piezo-resistance regions for the piezo-resistors 140 and 142, p⁻ regions for the impurity diffusion layers 118 and 120, and n± regions for the impurity diffusion regions 124, 126, and 128.

Figure 18:
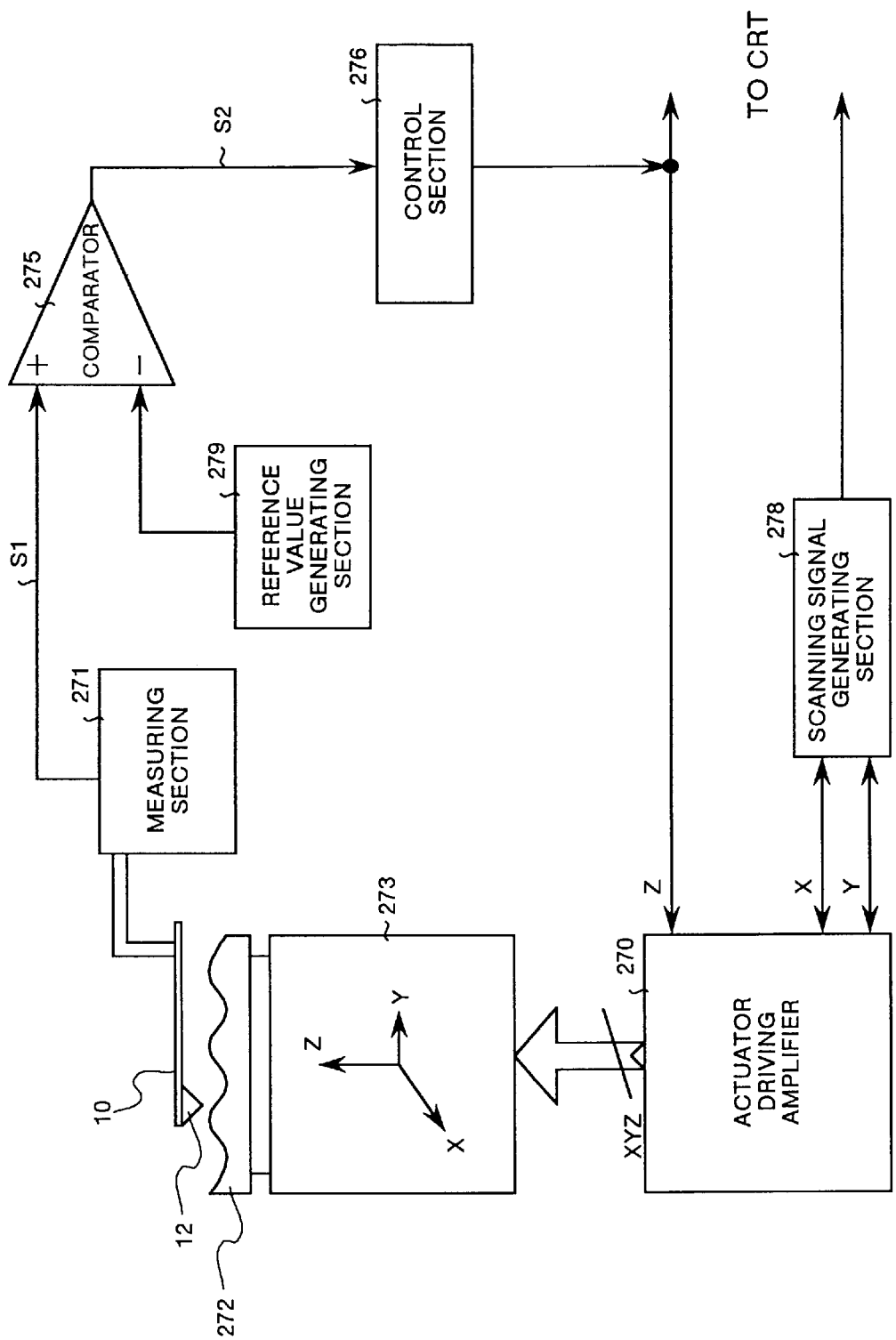
FIG. 18 is a view showing a structure of an SPM device according to Embodiment 4 of the present invention.

FIG. 18 is a block diagram showing a general structure of a scanning probe microscope device in which the SPM probe according to Embodiments 1 to 3 is applied. A sample 272 is placed on a three-dimensional sample stage 273, and a tip 12 of the SPM probe 10 having the structure described above is located above the sample 272. A measuring section 271 applies a bias signal to the SPM probe 10 to amplify an output signal representing the displacement of the SPM probe 10. A detection signal S1 from the SPM probe detected in the measuring section 271 is inputted in a non-inverting input terminal (+) of a comparator 275.

Reference values on detection signals from the SPM probe 10 have been inputted from a reference value generating section 279 into an inverting input terminal (−) of the comparator 275 so that an output from the comparator 275 will be zero, for example, when the amount of deflection is zero. An error signal S2 outputted from the comparator 275 is inputted in a control section 276. The control section 276 provides controls over an actuator-driving amplifier 270 so that the error signal S2 will be close to zero. An output signal from the control section 276 is outputted to a CRT as a brightness signal. A scanning signal generating section 278 outputs a signal to the actuator driving amplifier 270 so as to scan the sample 272 in the X-Y directions and also outputs a raster scanning signal to the CRT. Through these operations, a three-dimensional image corresponding to the output signal from the SPM probe is displayed on the CRT. The structure of the device is a general one, and for this reason, the device can be structured in a different manner on condition that functions thereof are the same as those described above.

As described above, the self-detecting type of SPM probe detects a deflection rate of a cantilever by measuring resistance values of U-shaped piezo-resistors used in the cantilever and a reference when the surface of a sample is scanned with a tip of the probe. Then, the self-detecting type of SPM probe according to any of Embodiments 1 to 3 can accurately detect the amount of deflection a cantilever by subjecting various type of insulation processing in between the piezo-resistors because accurate resistance values can not be measured if there occur a leak current between piezo-resistors adjacent to each other or a carrier by irradiation of light thereto.

Figure 14A:
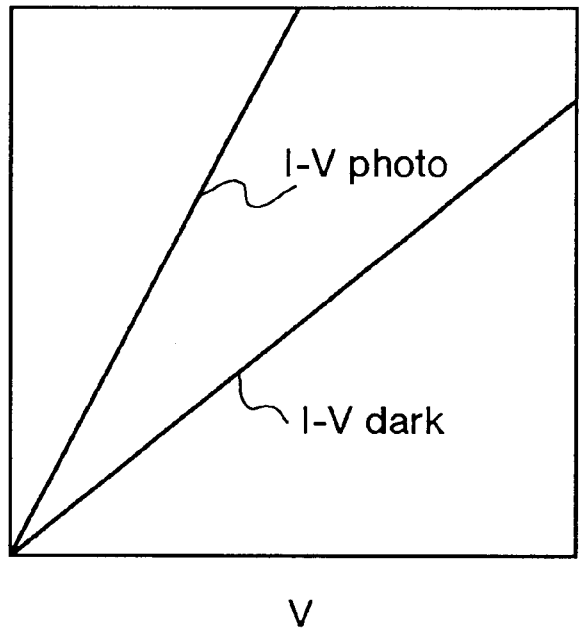
FIGS. 14A and 14B are diagrams showing volt-ampere characteristics when a piezo-resistor is irradiated and when it is not irradiated.
Figure 14B:
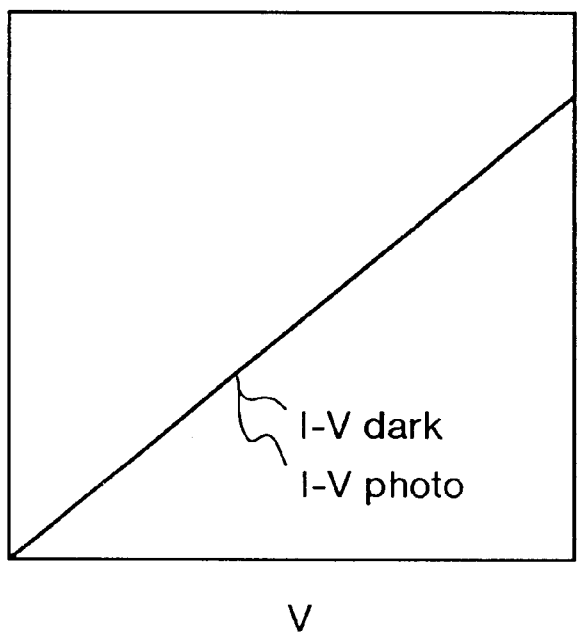

FIGS. 14A and 14B are diagrams showing volt/ampere characteristics when a piezo-resistor is irradiated with light (photo) and when it is not irradiated (dark), FIG. 14A shows an example of comparison of the characteristics and FIG. 14B shows the characteristics according to the present invention. In the example of comparison in FIG. 14A, the volt/ampere characteristics (namely resistance values) are different when the piezo-resistor is irradiated with light (photo) and when it is not irradiated (dark), so that resistance values in piezo-resistors can not be measured accurately.

However, it is understood that the present invention as shown in FIG. 14B obtains, by subjecting insulation processing to each space between piezo-resistors, a result of that the volt/ampere characteristics (resistance values) are not changed when the piezo-resistor is irrigated with light (photo) and also when it is not irradiated (dark) so that resistance values in piezo-resistors can be measured accurately at any time, which allows an accurate determination of the amount of deflection.

Figure 15A:
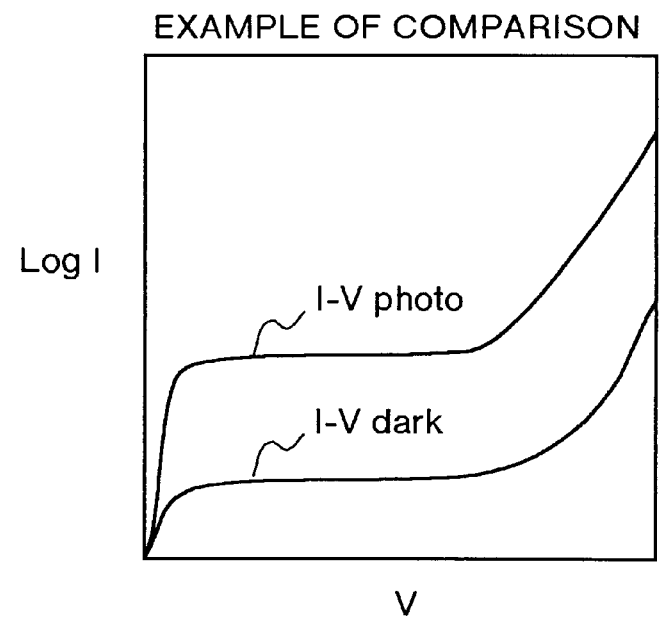
FIGS. 15A and 15B are diagrams showing leak current characteristics when a piezo-resistor is irradiated and when it is not irradiated.
Figure 15B:
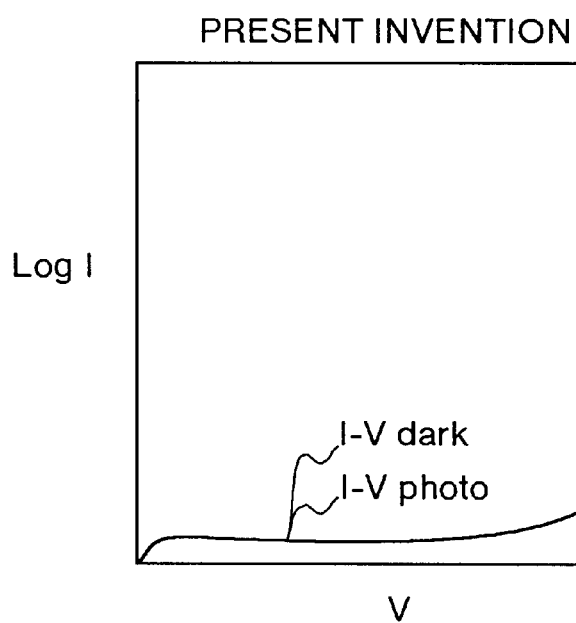
Figure 17:
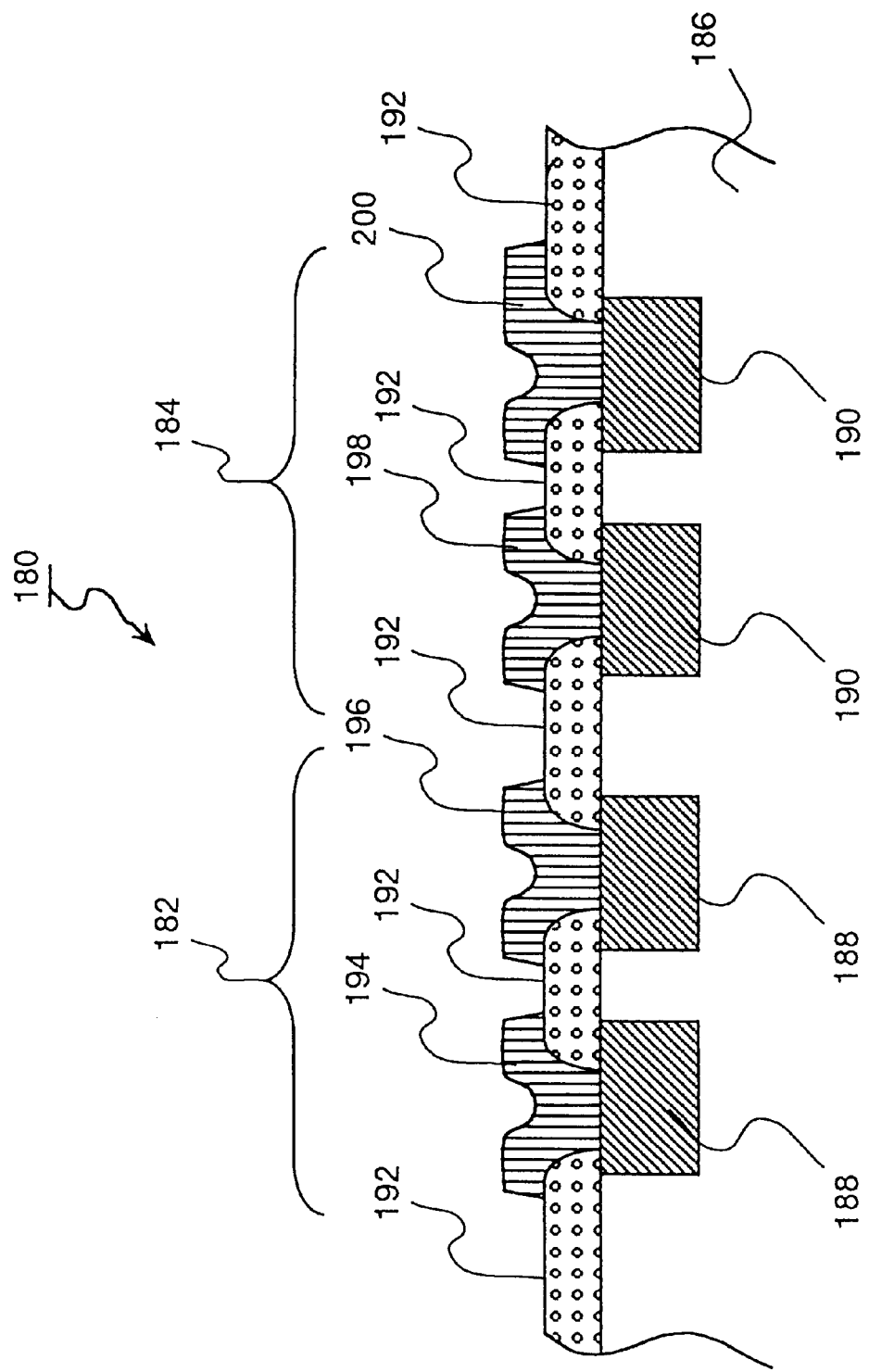
FIG. 17 is a cross-sectional view of the SPM probe taken along the line D—D in FIG. 16.

FIGS. 15A and 15B show diagrams showing log I–V characteristics (namely, leak current characteristics) when a piezo-resistor is irradiated with light (photo) and when it is not irradiated (dark), and FIG. 15A shows an example of comparison and FIG. 15B shows a result according to the present invention. In the example of comparison in FIG. 15A, the amount of leak current is different when the piezo-resistor is irradiated with light (photo) and when it is not irradiated (dark) and also there is a large amount of leak current in its dark state, so that resistance values in piezo-resistors can not be measured accurately.

However, it is understood that the present invention as shown in FIG. 15B obtains, by subjecting insulation processing between piezo-resistors, a result of that the leak current characteristics are not changed when the piezo-resistor is irradiated with light (photo) and also when it is not irradiated (dark) so that the leak current itself can be made smaller as compared to that in the dark state in the example of comparison, and for this reason resistance values in piezo-resistors can be measured accurately at any time, which allows an accurate determination of the amount of deflection.

With the invention, occurrence of a leak current or noise generated by a carrier due to light can be prevented, which allows accurate detection of the amount of deflection of the cantilever.

With the invention, occurrence of a leak current in a reference or noise generated by a carrier due to light when reference resistance values are measured can be prevented, which allows an accurate detection of the amount of deflection of a cantilever.

With the invention, impurity diffusion layers each consisting of a conductive type reverse to that of a semiconductor substrate are formed in each space between a piezo-resistor and the semiconductor substrate to separate the elements from one another, so that occurrence of a leak current or noise generated by a carrier due to light can be prevented.

With the invention, piezo-resistors are formed on semiconductor layers each formed in the same U shape as that of the resistor and an insulated layer is located between each semiconductor layer and a semiconductor substrate to separate the elements from one another, so that occurrence of a leak current or noise generated by a carrier due to light can be prevented.

With the invention, impurity diffusion layers each consisting of a conductive type reverse to that of a semiconductor substrate are formed in each space between a piezo-resistor and the semiconductor substrate, and insulators are also formed between piezo-resistors opposite to each other to separate the elements from one another, so that occurrence of a leak current or noise generated by a carrier due to light can be prevented.

With the invention, above described probe with less leakage of light is used in the SPM device, so that a light shielding mechanism that is conventionally required can be eliminated and noise due to leak current can be prevented, and high-efficiency measurement can be made.

This application is based on Japanese patent applications No. HEI 9-320184 and No. HEI 10-161175 filed in the Japanese Patent Office on Nov. 20, 1997 and Jun. 9, 1998, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A self-detecting SPM probe comprising: a substrate; an insulating layer formed on the substrate; and a plurality of U-shaped semiconductor islands formed on the insulating layer, each semiconductor island having a U-shaped piezo-resistor formed therein so that adjacent legs of the U-shaped piezo-resistors are formed in adjacent legs of the semiconductor islands such that an insulating region is formed between adjacent U-shaped piezo-resistors and between adjacent legs of the respective U-shaped piezo-resistors.

2. An instrument having a probe and means for causing relative scanning movement of the probe across the surface of an object for detecting surface characteristics of the object; wherein the probe comprises a self-detecting SPM probe according to claim 1.

3. A self-detecting SPM probe according to claim 1; wherein one of the U-shaped piezo-resistors comprises a reference probe for measuring a reference resistance value in a vicinity of a U-shaped piezo-resistor adjacent thereto.

4. An instrument having a probe and means for causing relative scanning movement of the probe across the surface of an object for detecting surface characteristics of the object; wherein the probe comprises a self-detecting SPM probe according to claim 3.

5. An SPM probe comprising: a substrate; an embedded insulating layer formed on the substrate; and a plurality of U-shaped islands formed over the embedded insulating layer, each U-shaped island having a U-shaped piezo-resistor formed therein so that adjacent U-shaped piezo-resistors and adjacent legs of the respective U-shaped piezo-resistors are electrically isolated from each other.

6. An SPM probe according to claim 5; wherein the at least one U-shaped piezo-resistor comprises a plurality of piezo-resistors, and further comprising another impurity region formed in the substrate to electrically isolate adjacent piezo-resistors.

7. An SPM probe according to claim 5; wherein at least one of the U-shaped piezo-resistors comprises a reference piezo-resistor used as a reference resistance for noise reduction.

8. An SPM probe according to claim 5; further comprising an insulator formed on the substrate between adjacent ones of the piezo-resistors to electrically isolate the U-shaped piezo-resistors from each other.

9. An instrument having a probe and means for causing relative scanning movement of the probe across the surface of an object for detecting surface characteristics of the object; wherein the probe comprises an SPM probe according to claim 5.

10. A method of forming an SPM probe on a semiconductor substrate, comprising the steps of: forming a lever portion in the substrate; forming a supporting portion in the substrate for supporting the lever portion; forming a U-shaped impurity region in the substrate having adjacent legs extending from the lever portion to the supporting portion, the impurity region having a conductivity type opposite that of the substrate; and forming a U-shaped piezo-resistor in the U-shaped impurity region.

11. A method of forming an SPM probe according to claim 10; further comprising the step of forming a tip having a sharp point in the lever portion proximate and end of the lever portion opposite the supporting portion.

12. A method of forming an SPM probe according to claim 10; wherein the steps of forming the lever portion and the supporting portion comprise etching the substrate at a first surface to form the lever portion in a desired shape and etching the substrate at a second surface to reduce a thickness thereof so that the lever portion has a smaller thickness than the supporting portion.

13. A method of forming an SPM probe on a semiconductor substrate, comprising: a step for forming a lever portion in the substrate; a step for forming a tip having a sharp point in the lever portion proximate a first end thereof; a step for forming a supporting portion in the substrate for supporting a second end of the lever portion opposite the first end; a step for forming a U-shaped piezo-resistor in the SPM probe extending from the lever portion to the supporting portion; and a step for forming an impurity region in the substrate to electrically isolate adjacent legs of the U-shaped piezo-resistor from each other.

14. A method of forming an SPM probe according to claim 13; wherein the step for forming the impurity region comprises the step of forming a U-shaped impurity diffusion region in the substrate to have a conductivity type opposite that of the substrate; and the step for forming the U-shaped piezo-resistor comprises the step of forming the U-shaped piezo-resistor in the impurity diffusion region.

15. A method of forming an SPM probe comprising the steps of:

providing a substrate having top and bottom surfaces;

etching the top surface of the substrate to form a tip having a sharp point therein;

forming a U-shaped piezo-resistor in the top surface of the substrate;

etching the top surface of the substrate in the shape of a cantilever probe having a lever portion and a supporting portion for supporting the lever portion at an end thereof, the etching being conducted so that the sharp point is proximate a distal end of the lever portion opposite the supporting portion and the U-shaped piezo-resistor extends from the supporting portion to the lever portion;

forming an impurity region in the substrate to electrically isolate adjacent legs of the U-shaped piezo-resistor from each other; and etching the bottom surface of the substrate so that a thickness of the supporting portion is greater than that of the lever portion.

* * * * *